Feb. 25, 1936. W. C. PFEIFFER Re. 19,871

APPARATUS FOR HANDLING MULTIPLE PAPER STRIPS

Original Filed Aug. 31, 1933 6 Sheets-Sheet 1

INVENTOR
WILLIAM C. PFEIFFER.
BY Toulmin & Toulmin
ATTORNEYS

Feb. 25, 1936. W. C. PFEIFFER Re. 19,871

APPARATUS FOR HANDLING MULTIPLE PAPER STRIPS

Original Filed Aug. 31, 1933 6 Sheets-Sheet 2

INVENTOR
WILLIAM C. PFEIFFER.
BY Toulmin & Toulmin
ATTORNEYS

Feb. 25, 1936. W. C. PFEIFFER Re. 19,871
APPARATUS FOR HANDLING MULTIPLE PAPER STRIPS
Original Filed Aug. 31, 1933 6 Sheets-Sheet 3
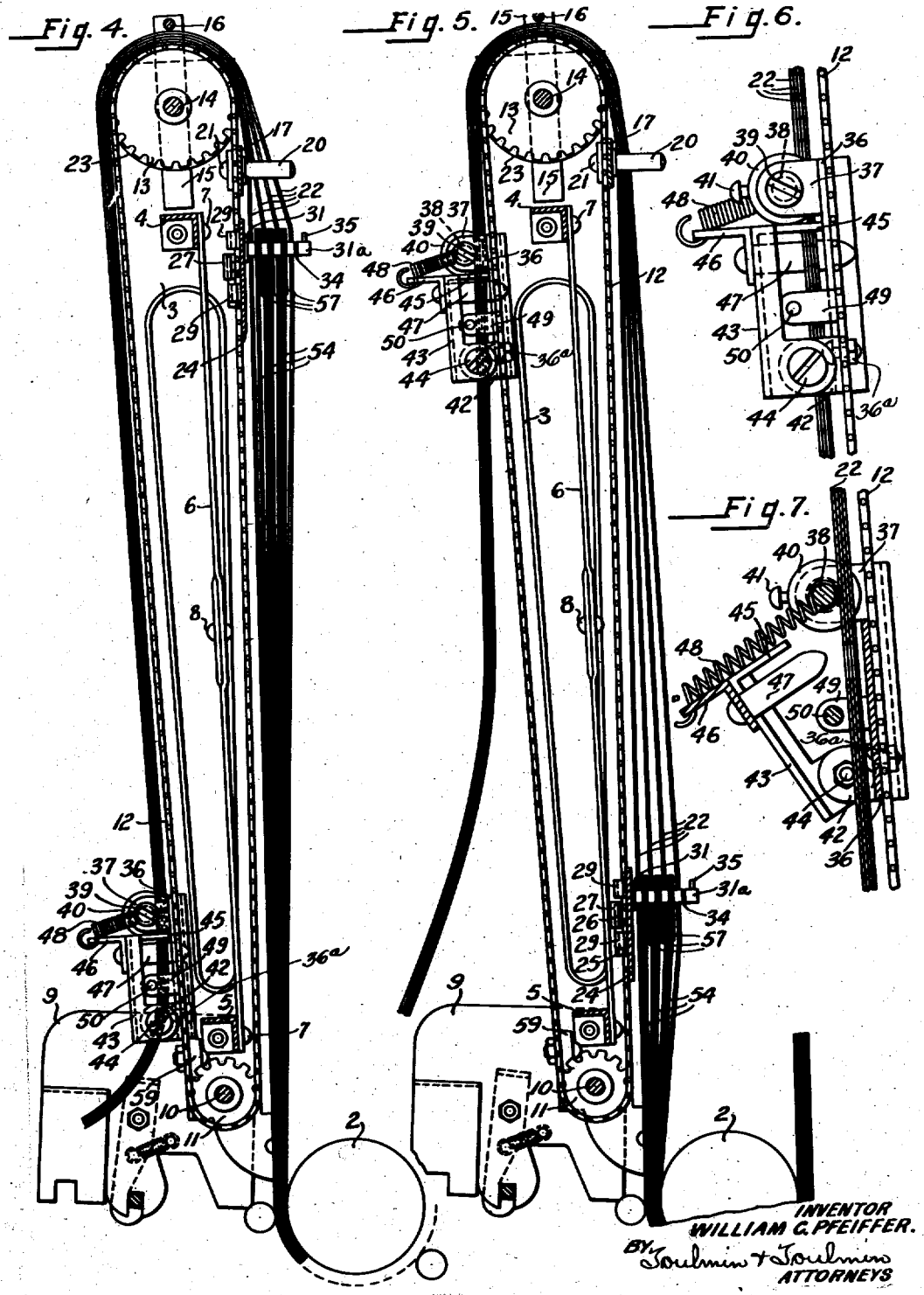
INVENTOR
WILLIAM C. PFEIFFER.
BY Toulmin & Toulmin
ATTORNEYS Feb. 25, 1936. W. C. PFEIFFER Re. 19,871

APPARATUS FOR HANDLING MULTIPLE PAPER STRIPS

Original Filed Aug. 31, 1933 6 Sheets-Sheet 4

INVENTOR
WILLIAM C. PFEIFFER.
BY Toulmin & Toulmin
ATTORNEYS

Feb. 25, 1936. W. C. PFEIFFER Re. 19,871
APPARATUS FOR HANDLING MULTIPLE PAPER STRIPS
Original Filed Aug. 31, 1933 6 Sheets-Sheet 5
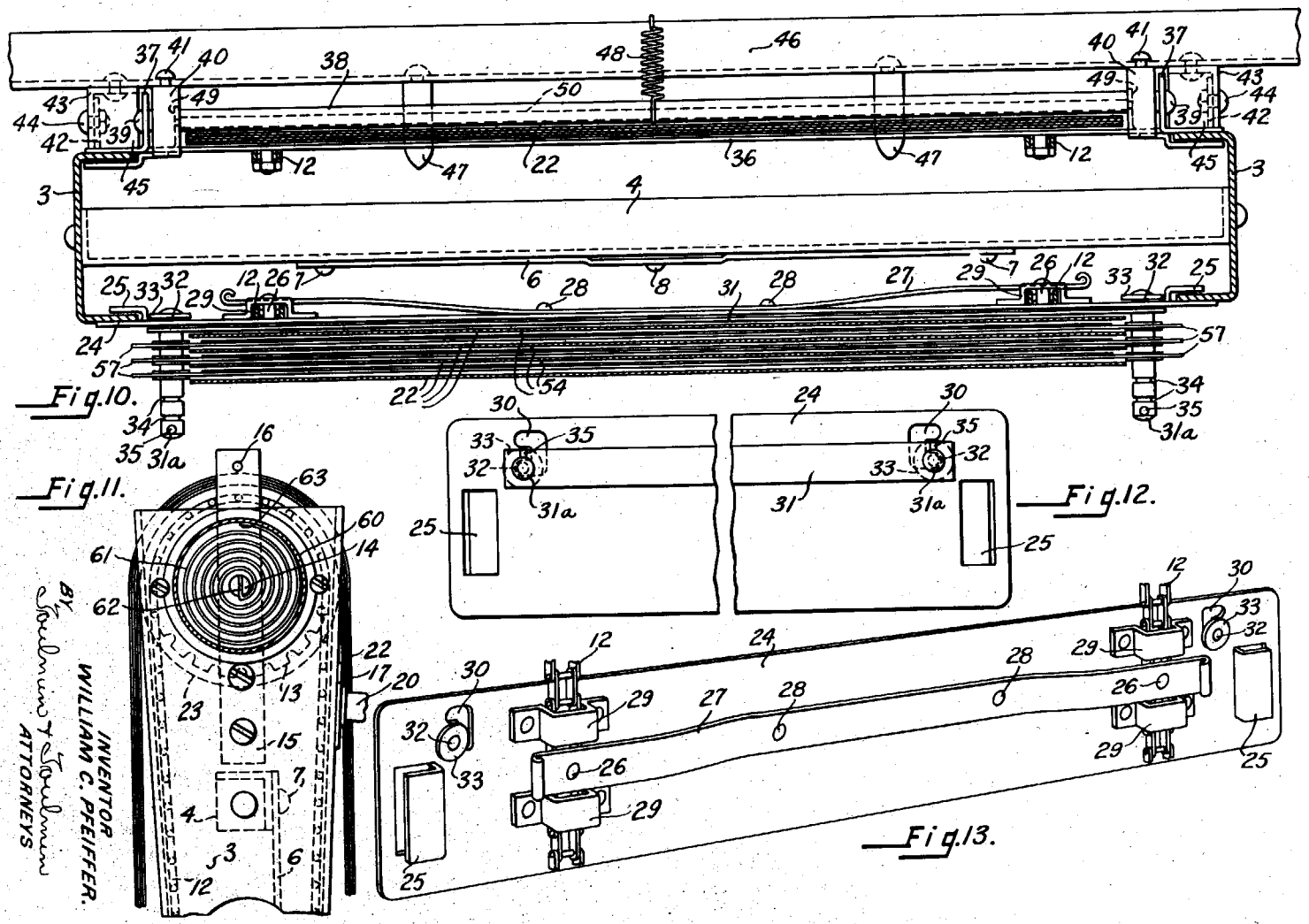
INVENTOR
WILLIAM C. PFEIFFER.
BY Toulmin & Toulmin
ATTORNEYS

APPARATUS FOR HANDLING MULTIPLE PAPER STRIPS

Original Filed Aug. 31, 1933 6 Sheets-Sheet 6

INVENTOR
WILLIAM C. PFEIFFER.
BY Toulmin & Toulmin
ATTORNEYS

Reissued Feb. 25, 1936

Re. 19,871

UNITED STATES PATENT OFFICE 19,871

APPARATUS FOR HANDLING MULTIPLE PAPER STRIPS

William C. Pfeiffer, Dayton, Ohio, assignor to The Egry Register Company, Dayton, Ohio, a corporation of Ohio Original No. 2,011,826, dated August 20, 1935, Serial No. 687,631, August 31, 1933. Application for reissue January 9, 1936, Serial No. 58,419

23 Claims. (Cl. 197—126)

This invention relates to improvements in means for supporting, aligning and guiding a plurality of superimposed strips of paper, and means for supporting in interleaved relationship with the strips of paper, sheets of carbon paper, and for utilizing all parts of the carbon sheets.

The invention has for its object the provision, in connection with an apparatus for supporting a plurality of strips of paper, means for adjustably supporting a plurality of sheets of carbon paper interleaved between the strips of paper.

It is an object of the invention to provide, in connection with a typewriter, means for supporting a plurality of superimposed strips of paper fed to the typewriter, and means for adjustably supporting a plurality of sheets of carbon paper interleaved between the strips of paper so that the sheets of carbon paper may be adjusted that the type of the typewriter will not strike upon the same line at all times. In other words, the type may strike upon that part of the carbon sheet between lines formerly used.

It is also an object of the invention to provide, in connection with a typewriter, a frame for supporting a plurality of superimposed strips of paper adapted to be fed through the typewriter and by the typewriter, and to provide on this frame adjustable means for supporting sheets of carbon paper, and means to adjust the sheets of carbon paper with relation to the supporting means.

It is a further object of the invention to provide an improved method by which the relationship of the carbon sheets and the strips of paper may be regulated and the length of the sheets controlled so that the carbon portions that are used can be removed, the sheets readjusted in position and the operation repeated.

These and other objects will appear from the following description taken in connection with the drawings.

Referring to the drawings:

Figure 4 is a section on the inside of one of the side bars. In Figure 4 the carbon sheets are in their most elevated position, with the lower ends of the paper strips engaging the platen of the typewriter.

Figure 5 is a section similar to Figure 4 but showing the position of the strips of paper and the carbon sheets at the end of the writing operation.

Figure 6 is a view showing one end of the aligning mechanism, together with the chain to which it is attached and the strips of paper aligned thereby.

Figure 7 is a vertical sectional view of the alignment mechanism, with the aligning pins released from the holes in the paper strips.

Figure 10 is a section on the line 10—10 of Figure 3.

Figure 11 is a view showing the spring attached to one of the sprocket chain shafts. This view shows the spring casing in section.

Figure 12 shows the front face of the carbon supporting plate, with means thereon for adjusting the position of the carbon sheets with relation to the plate.

Figure 13 shows the back face of the carbon supporting plate, with means thereon for adjustably supporting the plate on the supporting chain.

Figure 1:
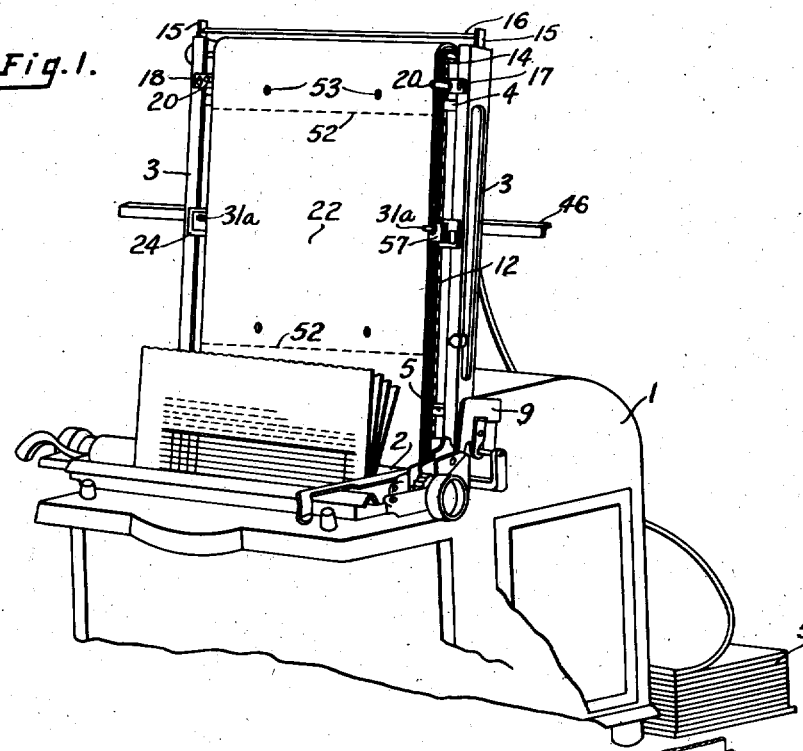
Figure 1 is a perspective view showing the upper part of a typewriter, with the apparatus attached thereto.
Figure 2:
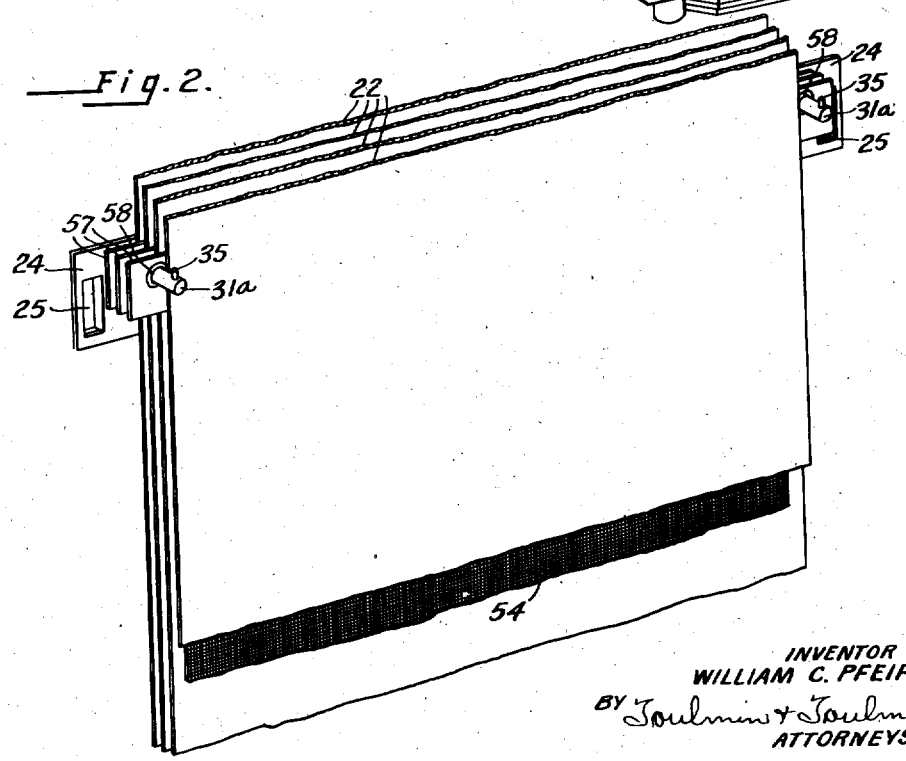
Figure 2 shows fragments of the superimposed strips of paper with the interleaved carbon sheets therebetween and the supports for the carbon sheets.
Figure 3:
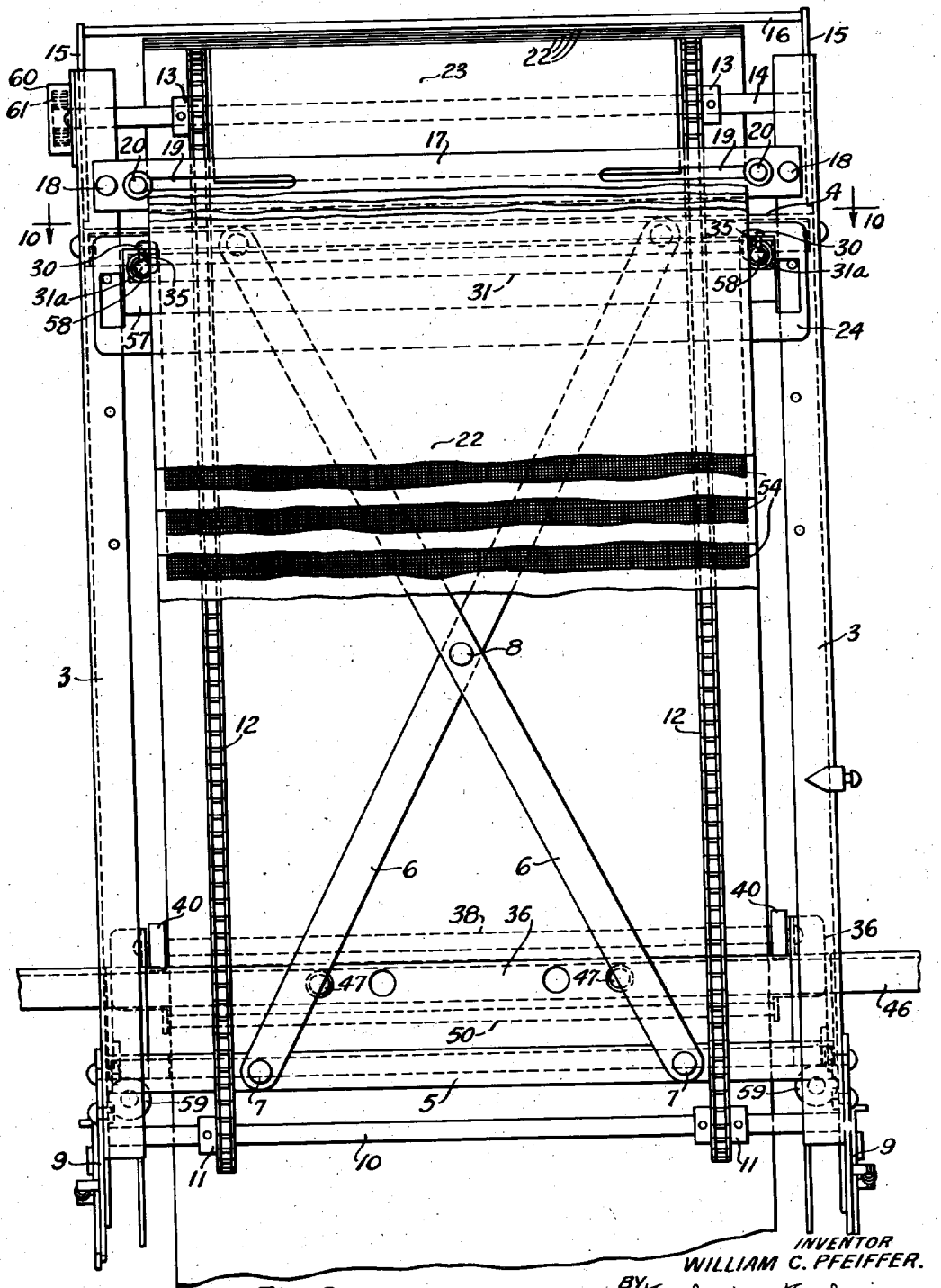
Figure 3 is a front elevation of the apparatus with parts of the strips of paper and the carbon sheets broken away to show more fully the structure of the apparatus.

The present apparatus is adapted to be used in connection with typewriters, but may be used with other instrumentalities to which a plurality of superimposed strips of paper is to be fed.

The typewriter is indicated by the numeral 1 and has the usual platen 2. On this typewriter is supported in any suitable manner a frame, which consists of side bars 3, connected at their upper ends by means of a cross bar 4, and at their lower ends by means of a cross bar 5. These two cross bars are braced by means of braces 6, which are riveted by means of rivets 7 to the cross bars and to each other by means of a rivet 8. The lower end of the frame is provided with brackets 9, by which the side bars are suitably attached to the frame of the typewriter.

On the lower ends of the side bars and rotatably supported thereby is a lower shaft 10, which has thereon a pair of sprockets 11. Around each of these sprockets is a chain 12, each of which operatively connects the lower sprockets 11 to another pair of sprockets 13 located on the upper shaft 14, rotatably mounted on the upper end of the frame upon two bars 15, each attached to one of the side bars by screws, not shown. Each shaft has thereon a pair of sprockets connected by means of the sprocket chains 12. The upper ends of these bars 15 are connected by means of a rod 16.

On the upper end of the frame and attached to the side bars is a guide plate 17. This plate is attached to the side bars by means of rivets 18, and has adjacent each end thereof a slot 19 adapted to receive one end of a guide pin 20, adjustably supported in the slot by means of a screw 21 (Figure 4). These pins may be adjusted to and from each other, and serve to guide strips of paper 22 as they pass over a drum 23 mounted on the shaft 14.

Supported on the front of the frame and by the side bars thereof, is a carbon supporting plate 24. This plate engages the side bars at each end, and has struck up therefrom tongues 25, which fit behind part of the side bars for guiding the plate as it moves up and down on the frame. The frame is U-shaped, with the arms thereof projecting toward each other, and it is the front arms of these side bars that are engaged by the carbon supporting plate and the tongues struck up therefrom.

This plate is adjustably attached to the chains 12 by means of pins 26. There are two of these pins, one attached to each end of a flat spring 27, attached intermediate its ends to the plate by means of rivets 28 (Figure 10). The plate is provided with holes 26a to receive the free ends of these pins. These pins pass through links of the chains for supporting the plate on the chains. Each pin is supported at one end by the flat spring, while its other end is supported by the plate when the plate is supported on the chains. The chains are held in close engagement with the plate by means of loops 29. In the present instance there are two loops for each end of the flat spring. These loops prevent the chain from pulling the pins out of the holes so there is no danger of the carbon supporting plate being accidentally released from the chains during the operation of the apparatus.

Adjacent each end of the plate 24 is a U-shaped slot 30 (Figures 12 and 13). The arms of these slots project away from the ends of the plate so that the arms of one slot project toward the arms of the other slot and are parallel therewith. On the front side of the plate 24 is a spring strip 31, which has attached to each end a pin 31a. The parts of these pins on one side of the spring strip are adapted to support a plurality of sheets of carbon paper interleaved between strips of paper, while the parts of the pins projecting on the other side of the spring strip serve to engage the plate 24 within the slots 30 to hold the spring strip in the slots in adjusted position with relation to the plate. By this means the carbon paper can be so adjusted as to cause the type to strike the portion of the unused carbon sheets between the lines previously struck. The parts of the pins projecting through the slots are indicated by the numeral 32, and have thereon washers 33 which serve to hold the pins and the spring strip against the plate, but permit a free movement in relation thereto.

The pins 31a have thereon a plurality of circular notches 34 adapted to receive a member, not shown, for holding the carbon sheets on the pins. The extreme outer ends of these pins are also provided with small pins 35 to prevent the carbon sheets from slipping off of the pins 31a in the event no other instrumentality is used for that purpose.

At the back side of the frame is a paper feed plate 36, which is attached to the sprocket chains 12, as by the bolts 36a. The feed plate 36 has at each end, on the upper edge thereof, a bracket 37 (Figures 4 to 8 inclusive). These brackets support a guide rod 38 by means of screws 39 extending through the brackets into the ends of the rod. On each end of the rod, adjacent a bracket, is a guiding disc 40 adjusted with relation to the rod by means of a set screw 41. These discs are spaced according to the width of the paper being used on the apparatus. The distance these discs are apart also corresponds to the distance the pins 20 are apart.

The feed plate 36 also has on its lower edge, at each end, a bracket 42 to which is attached one end of an arm 43 by means of bolts 44. The upper end of each arm 43 has a stop 45 adapted to engage the upper edge of the feed plate. To the stop ends of the arms 43 is attached an angle iron 46, which has thereon aligning and feeding pins 47 adapted to pass through holes in the strips of paper and through holes provided therefor in the upper edge of the feed plate. The angle iron is urged toward the feed plate by means of a spring 48 connected at one end to the angle iron and at its other end to the rod 38.

There is also provided on the feed plate intermediate its upper edges and between its ends, brackets 49 which support a guide rod 50. This guide rod serves to hold the strips of paper against the feed plate. This rod also cooperates with the rod 38 in holding the strips of paper in proper position when the aligning and feeding pins are withdrawn from the holes in the strips of paper.

Figures 8, 9:
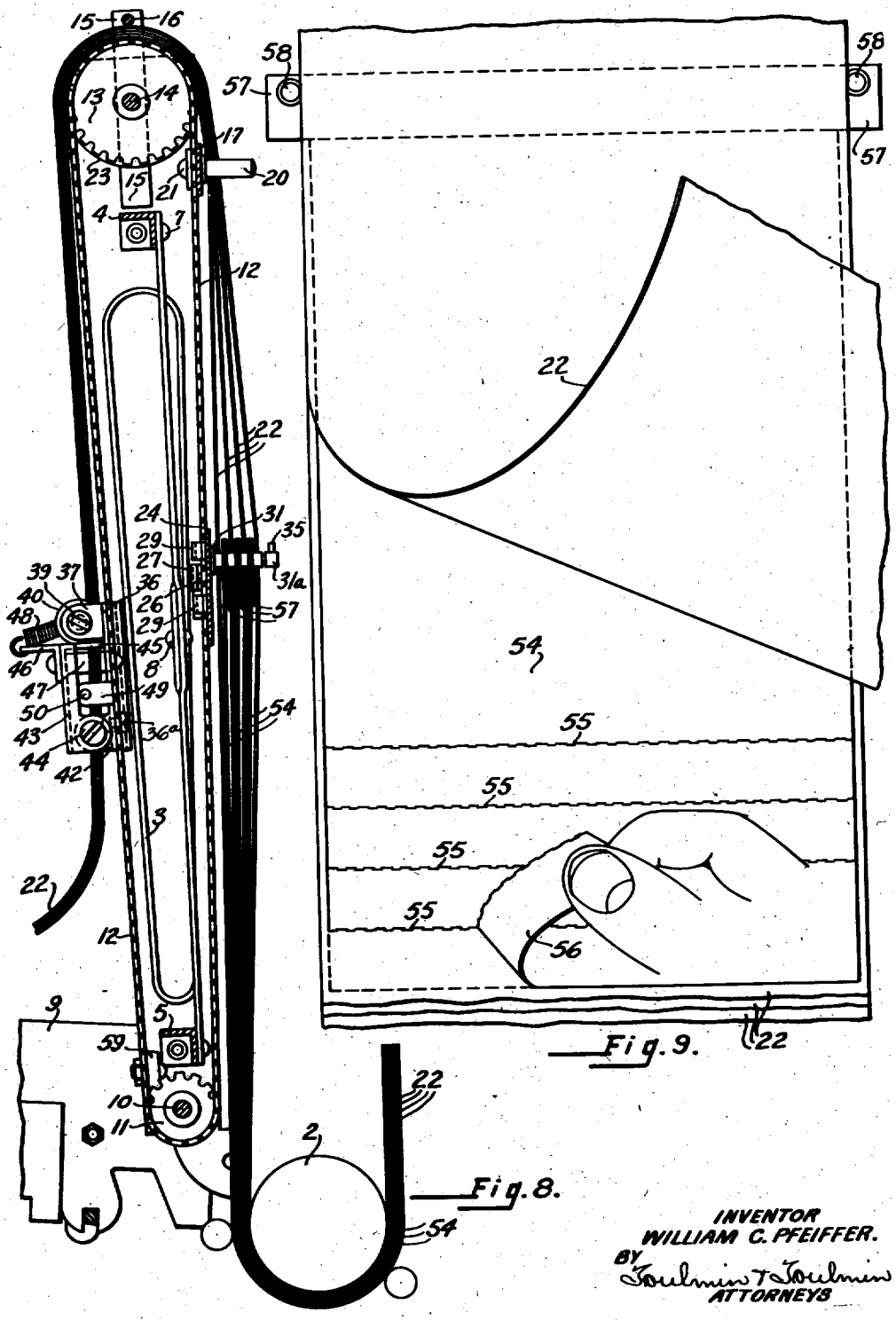
Figure 8 is a section similar to Figure 4 but with all of the parts in their intermediate positions.
Figure 9 is a view showing the lower ends of the strips of paper and the carbon sheets with perforations therein, by which the sheets are divided into narrow strips which may be easily torn off.
Figure 15:
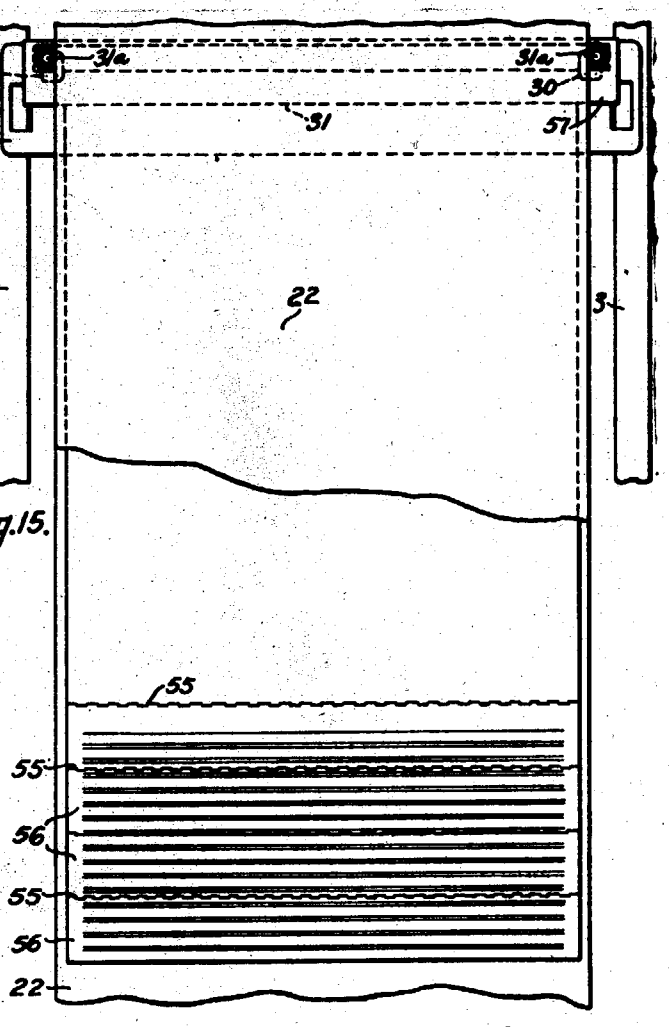
Figure 15 shows the carbon sheets supported in their upper position on the carbon supporting plate.
Figure 14:
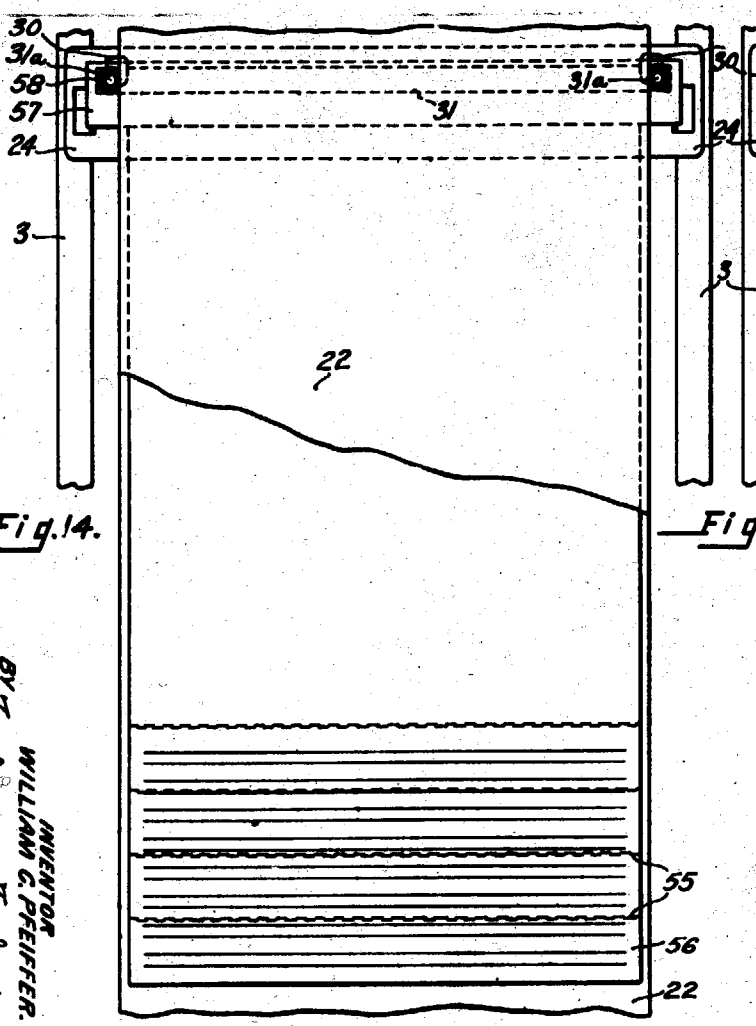
Figure 14 shows the carbon sheets supported in their lower position on the carbon supporting plate.

The strips of paper are fed over the drum at the top of the frame from a pile of paper 51, located on some suitable support behind the typewriter. Each strip of paper is divided by means of cross perforations 52, into sheets of sufficient size for the desired use (Figure 1). Adjacent the upper edge of each sheet of the strip are holes 53 for receiving the pins 47. The carbon sheets are indicated by the numeral 54 and may be divided, as shown in Figures 9, 14 and 15 into narrow strips by means of cross perforations 55. These narrow strips are indicated by the numeral 56, the width of which may be varied to suit the extent of the carbon sheet to be used. After any one of these narrow strips has been so used that it has become worthless it may be torn off.

The carbon sheets thus become shorter, and in order to use the other part of the sheet it is necessary to lower the carbon supporting plate on the chains. This is done by withdrawing the pins 26 from the chains so that the plate may be slipped down, after which the pins may be forced to engage another link in the chain, whereby the plate is again supported in its desired position. When another of these narrow strips of carbon is used it is torn off and the plate is again lowered for further use of the carbon sheet. Each carbon sheet is supported by means of a narrow strip 57 composed of some suitable material. Usually this strip is made of some fibrous material, and has in each end a hole 58 adapted to receive one of the pins 31*a*.

The lower end of each side bar is provided with a rubber stop disc 59 engaged by the paper feed plate when it is in its lowest position, and when the carbon supporting plate is in its uppermost position. On one of the side bars without the frame is a spring housing 60 (Figure 11), which has therein a coil spring 61 attached at one end at the point 62 to the upper shaft 14, and at its other end at the point 63 to the spring housing 60.

By adjusting the spring strip 31 on the plate 24 the point at which the type engages the carbon sheets may be changed so that the whole of the carbon sheet may be used. By varying the position of the plate 24 on the chains the whole length of the carbon sheet may be varied. When a long sheet is used this plate is attached to the chain near the upper end of the frame while the feed plate is engaging the stop. With shorter sheets of carbon paper the plate 24 is positioned on the chain a greater distance from the top of the frame, this distance depending upon the length of the carbon sheet. When the carbon sheets have been used and the lower narrow strips thereof torn off, this plate 24 is lowered so that unused parts of the carbon sheets may be used.

By means of applicant's apparatus every available part of the carbon sheet is used, thereby avoiding waste and lengthening the life of the carbon sheets and increasing the efficiency of the writing.

It will be understood that I desire to comprehend within my invention such modifications as come within the scope of my claims and my invention.

Having thus fully described my invention, what I claim as new and desire to secure by Letters Patent, is:

1. In an apparatus for supporting and guiding a plurality of superimposed strips of paper, an aligning device movable by the strips of paper, a flexible member attached to the aligning device for movement therewith, a plate attached to the flexible member, and means on said plate to support sheets of carbon paper interleaved between said strips, said plate being arranged to simultaneously adjust the positions of the carbon sheets relative to said aligning device by minute gradations.

2. In an apparatus for supporting and guiding a plurality of superimposed strips of paper, a member adapted to be attached to and be moved by the movement of the strips of paper, and means supported on the member to support sheets of carbon paper interleaved between the strips of paper, said carbon-supporting means being arranged to simultaneously adjust the positions of the carbon sheets relative to said member by minute gradations.

3. In an apparatus for supporting and guiding a plurality of superimposed strips of paper, a member adapted to be attached to and be moved by the movement of the strips of paper, and means supported on the member to support sheets of carbon paper interleaved between the strips of paper, said means comprising a plate having adjustably mounted pins thereon for holding the sheets of carbon paper, said plate being arranged to simultaneously adjust the positions of the carbon sheets relative to said plate by minute gradations.

4. In an apparatus for supporting and guiding a plurality of superimposed strips of paper, a member adapted to be moved by the movement of the strips of paper, and means adjustably supported on the member to support sheets of carbon paper interleaved between the strips of paper, said means comprising a plate having at each end a U-shaped slot, a pin for each slot and means for holding the pin in either arm of the slot.

5. In an apparatus for supporting and guiding a plurality of superimposed strips of paper, a member adapted to be moved by the movement of the strips of paper, and means adjustably supported on the member to support sheets of carbon paper interleaved between the strips of paper, said means comprising a plate having at each end a U-shaped slot, a pin for each slot and spring means for holding the pin in either arm of the slot.

6. In an apparatus for supporting and guiding a plurality of superimposed strips of paper, a pair of traveling members adapted to be attached to and be moved by the movement of the strips of paper, a plate adjustably mounted on said members, and means adjustably mounted on the plate to support sheets of carbon paper interleaved between the strips of paper.

7. In an apparatus for supporting and guiding a plurality of superimposed strips of paper, a pair of traveling members adapted to be moved by the movement of the strips of paper, a plate adjustably mounted on said members, a spring strip having at each end a pin for supporting sheets of carbon paper interleaved between the strips of paper, and means on the plate cooperating with the spring strip to support the pins on the plate.

8. In an apparatus for supporting and guiding a plurality of superimposed strips of paper, a pair of traveling members adapted to be attached to and be moved by the movement of the strips of paper, a plate, spring-operated means to adjustably support the plate on said members, and means on the plate to support sheets of carbon paper interleaved between the strips of paper.

9. In an apparatus for supporting and guiding a plurality of superimposed strips of paper, a pair of chains adapted to be attached to and be moved by the movement of the strips of paper, a plate, a spring attached to the plate, means on the spring to engage the chains to adjustably support the plate on the chains, and means on the plate to support sheets of carbon paper interleaved between the strips of paper.

10. In an apparatus for supporting and guiding a plurality of superimposed strips of paper, a pair of chains adapted to be attached to and be moved by the movement of the strips of paper, a plate, a spring attached to the plate, means on the spring to engage the chains to adjustably support the plate on the chains, and means on the plate to support sheets of carbon paper interleaved between the strips of paper, said last-named means comprising pins and means to adjustably support the pins on the plate.

11. In an apparatus for handling a plurality of superimposed strips of paper, a frame, a plate having at each end guide members engaging the frame, a spring strip adapted to lie against one face of the plate, a pin on each end of said strip for supporting sheets of carbon paper interleaved between the strips of paper, and means on the pins cooperating with the plate and actuated by said strip to hold the pins on the plate.

12. In an apparatus for handling a plurality of superimposed strips of paper, a frame, a plate having at each end guide members engaging the frame, a spring strip adapted to lie against one face of the plate, a pin on each end of said strip for supporting sheets of carbon paper interleaved between the strips of paper, and means on said strip cooperating with the plate and actuated by said strip to hold the pins on the plate.

13. In an apparatus for handling a plurality of superimposed strips of paper, a frame, a plate having at each end guide members engaging the frame and adjacent each end a slot, a spring strip, means on each end of said strip to support sheets of carbon paper between the strips of paper, and means on said strip operated by the spring strip to engage the plate in the slots to support said strip on the plate.

14. In an apparatus for handling a plurality of superimposed strips of paper, a frame, a plate having thereon guide means engaging the frame and adjacent each end a slot, and a spring strip having at each end a pin, the pins projecting on one side of said strip to support a plurality of sheets of carbon paper interleaved between the strips of paper and projecting on the other side of said strip and operated by the spring strip to engage the plate in the slots for adjustably supporting the pins on the plate.

15. In an apparatus for handling a plurality of superimposed strips of paper, a frame having at each end a shaft, a pair of chains supported for movement by said shafts, a plate having thereon means to adjustably engage the chains and adjacent each end a slot, and a spring strip having at each end a pin projecting from both sides, the pins in one side of said strip being adapted to support a plurality of sheets of carbon paper interleaved between the strips of paper and on the other side of said strip adapted to engage because of the spring strip the plate in the slots for adjustably supporting the pins on the plate.

16. In an apparatus for handling superimposed strips of paper, a support for sheets of carbon paper comprising a plate having therein a pair of holes and a slot adjacent each hole, a spring attached to one side of the plate, a pair of pins on the spring, one pin for each hole, a spring strip on the other side of the plate, and a pair of pins on said strip, one end of each pin adapted to engage the plate in a slot to support the pins and said strip on the plate.

17. In an apparatus for handling superimposed strips of paper, a support for sheets of carbon paper comprising a plate having therein a pair of holes and a U-shaped slot adjacent each hole, a flat spring attached intermediate its ends to the plate and having in each end a pin to fit in one of the holes, and a spring strip having at each end a pin, the pins on one side of said strip being adapted to support sheets of carbon paper and on the other side of said strip being adapted to engage the plate in the arms of the slots to adjustably support the pins on said strip on the plate.

18. In an apparatus for handling superimposed strips of paper in combination with a typewriter, a frame supported on the typewriter, a pair of chains on the frame, means on the chains to engage the strips of paper to cause the chains to move, means to support a plurality of sheets of carbon paper interleaved between the strips, and means to adjustably connect said last-named means to the chains whereby the distance between the said first two means may be varied.

19. In combination, a frame, means on one side of the frame to guide and move with paper strips, means to travel with strips to align and maintain them in alignment, and means on the other side of the frame to support carbon sheets attached to said moving means adjustably.

20. In combination, a frame, means on one side of the frame to guide and move with paper strips, means to travel with strips to align and maintain them in alignment, means on the other side of the frame to support carbon sheets attached to said moving means adjustably, and means to shift said carbon sheets on their supporting means.

21. In combination with a frame to support and guide a strip of fan-folded paper, means to move said strip, means to support sheets of carbon paper between the folds of said strip, means removably attached to said strip and operated by the movement of said strip to move said second-named means, said last-named means comprising a chain to which said second-named means is adjustably attached.

22. An article of manufacture for supporting, on a movable conveyor adapted to convey the article supplementary to any conveying action of the paper, a plurality of copy-producing sheets interleaved between paper webs, said article consisting of a plate having on one side a guide portion for receiving and guiding said conveyor, a latching member cooperating therewith to releasably secure said plate to said conveyor, and a holder on said plate for holding said copy-producing sheets whereby to adjust the position of the copy-producing sheets with respect to the paper webs in order to vary the location at which copying commences on said paper.

23. In combination, a frame having means to support a plurality of strips of fan-folded paper, a movable paper positioner, a movable carbon sheet carrier, a holder on said carrier for holding carbon sheets interleaved between the paper strips, and a conveyor operatively interconnecting said paper positioner and said carbon carrier independently of said paper strips to move said positioner and said carrier in unison with one another, said carrier having an adjusting latch for disconnecting the carrier from said conveyor and re-connecting it in another location thereon.

WILLIAM C. PFEIFFER.